United States Patent [19]

Gebhardt

[11] Patent Number: 4,974,557

[45] Date of Patent: Dec. 4, 1990

[54] AUXILIARY DRIVE ARRANGEMENT OF AN INTERNAL COMBUSTION ENGINE FOR AN AIR COMPRESSOR

[75] Inventor: Hans Gebhardt, Langenzenn, Fed. Rep. of Germany

[73] Assignee: MAN Nutzfahrzeuge GmbH, Munich, Fed. Rep. of Germany

[21] Appl. No.: 345,021

[22] Filed: Apr. 28, 1989

[30] Foreign Application Priority Data

May 7, 1988 [DE] Fed. Rep. of Germany ....... 3815741

[51] Int. Cl.[5] .............................................. F16H 55/18

[52] U.S. Cl. ............................... 123/65 B; 123/70 R; 123/198 C; 74/409; 74/421 R; 74/437; 74/462

[58] Field of Search ............... 123/70 R, 65 B, 198 C; 74/409, 421 R, 437, 462; 92/140

[56] References Cited

U.S. PATENT DOCUMENTS

| | | | |
|---|---|---|---|
| 2,585,971 | 2/1952 | Sloane | 74/462 |
| 3,424,022 | 1/1969 | Greenberg et al. | 74/409 |
| 4,051,744 | 10/1977 | Oshima | 74/462 |
| 4,223,528 | 9/1980 | Vuilleumier | 74/462 |
| 4,423,707 | 1/1984 | Sihon et al. | 123/198 C |
| 4,573,439 | 3/1986 | Kasting | 123/198 C |
| 4,660,432 | 4/1987 | Damas | 74/409 |

*Primary Examiner*—Charles J. Myhre
*Assistant Examiner*—Weilun Lo
*Attorney, Agent, or Firm*—Becker & Becker, Inc.

[57] ABSTRACT

An air compressor, which is embodied as a single or multi-cylinder/piston compressor, and which is driven by gear wheels. The drive gear or pinion of the air compressor is disposed on the air compressor crankshaft and meshes with a gear wheel on the camshaft of an internal combustion engine. Provided on the periphery of the air compressor pinion is, for a single cylinder/piston compressor, one interval having an enlarged tooth gauge, and for a multi-cylinder/piston compressor, several such intervals, the number of which corresponds to the number of times the tangential force passes through zero during one air compressor crankshaft revolution, with the centers of the intervals being coordinated with the respective top dead center position of the air compressor piston.

2 Claims, 2 Drawing Sheets

AUXILIARY DRIVE ARRANGEMENT OF AN INTERNAL COMBUSTION ENGINE FOR AN AIR COMPRESSOR

BACKGROUND OF THE INVENTION

The present invention relates to an auxiliary drive arrangement of an internal combustion engine for an air compressor embodied as a single or multi-cylinder/piston compressor, with the piston or pistons that are guided in the cylinder or cylinders being driven, via a respective connecting rod, by a crankshaft that is connected to a drive gear or pinion that in turn is driven from the drive shaft of the internal combustion engine via gear wheels, whereby the air compressor pinion meshes with a gear wheel on a camshaft of the engine.

In contrast to air compressors having a V-belt drive, air compressors of the aforementioned general type that are driven by gear wheels have the tremendous advantage of having a maintenance-free drive mechanism. However, they also have the drawback that the compressed air that remains in the clearance or dead space of the air compressor after the top dead center position has been reached expands, as a result of which the tangential force that drives the air compressor suddenly becomes negative, and the air compressor looses torque. This leads to abrupt flank or side shifting or transition in the tooth mesh, along with an uncomfortable knocking noise. Aggravating the situation is that the greatest relative noise generation from the air compressor gear drive exists just when after a braking procedure, the engine is idling and the air tank is again filled with compressed air (for the compressed air units, such as the brakes, sliding doors or windows, etc.). Due to the low ignition pressures that exist in this situation, the idling noise of the engine is very low, and as a consequence the flank transition of the pair of gear wheels can be heard very distinctly.

A number of measures have become known for eliminating this drawback (i.e. reduction of the engagement side play), including:

1. conversion of the material pairing of the pair of gear wheels from steel to cast iron;
2. use of a split air compressor play-compensating gear wheel;
3. limiting the engagement side play by increasing the tooth gauge;
4. adjustment of the play by an eccentric shifting.

All of these measures are either expensive to produce or are structurally complicated and require an additional expenditure on the engine assembly line or during air compressor exchange in the work shop. Furthermore, a number of possibilities for errors and imprecision result due to individual adjustment practices. The greatest drawback in conjunction with plays or clearances that are too narrow is, however, the increased axial pressure or load that acts over the entire periphery upon the air compressor mounting and crankshaft, as well as on the camshaft and camshaft mounting. With drive shafts that are mounted on roller bearings, peripheral loads represent greatly impeded operating conditions. Where the drive shafts are mounted on friction bearings, the constantly effective axial pressure results in a high bearing pressure and premature failure of the bearing. This ultimately leads to a reduced service life of the overall air compressor arrangement.

It is an object of the present invention to prevent the generation of noise at the tooth flanks or sides, especially in the region of the top dead center position of the piston or pistons of the air compressor, whereby however increased peripheral bending loads on the air compressor crankshaft and on the camshaft are to be avoided.

BRIEF DESCRIPTION OF THE DRAWING

This object, and other objects and advantages of the present invention, will appear more clearly from the following specification in conjunction with the accompanying drawings in which.

Figure 1:
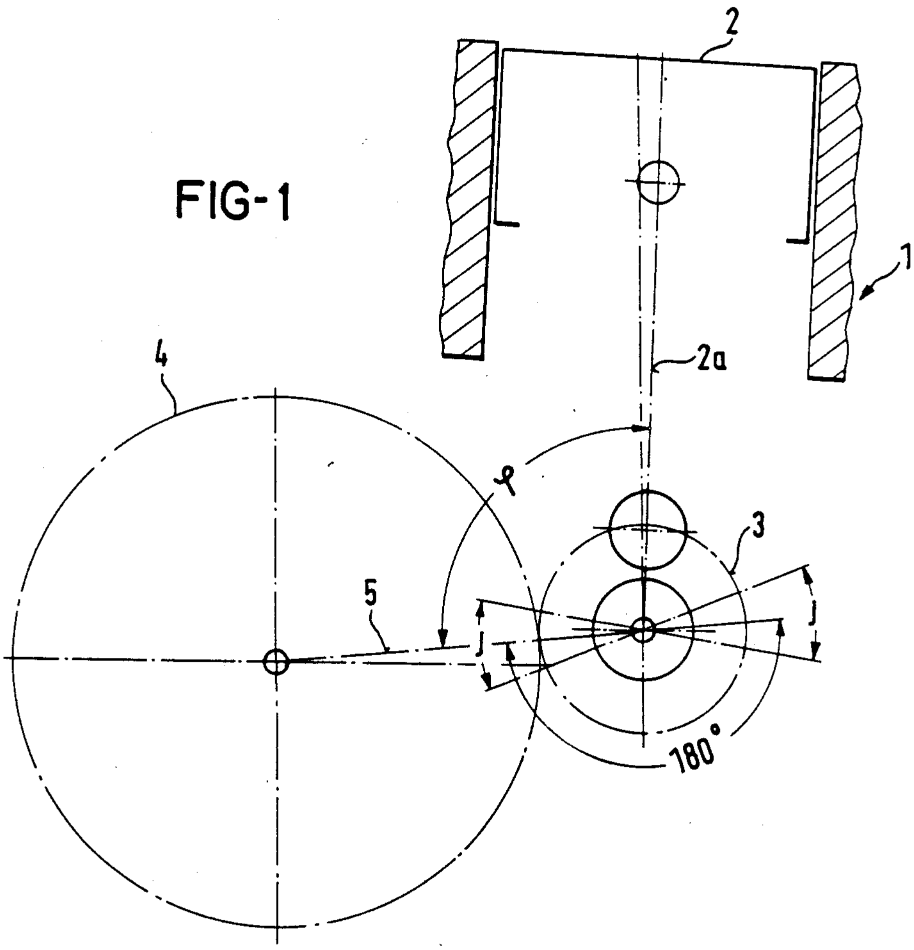
FIG. 1 is a view that provides a fragmentary schematic drawing illustration showing a partially cross-sectioned end view of one exemplary embodiment of an auxiliary drive arrangement for an air compressor having features in accordance with the present invention.
Figure 2:
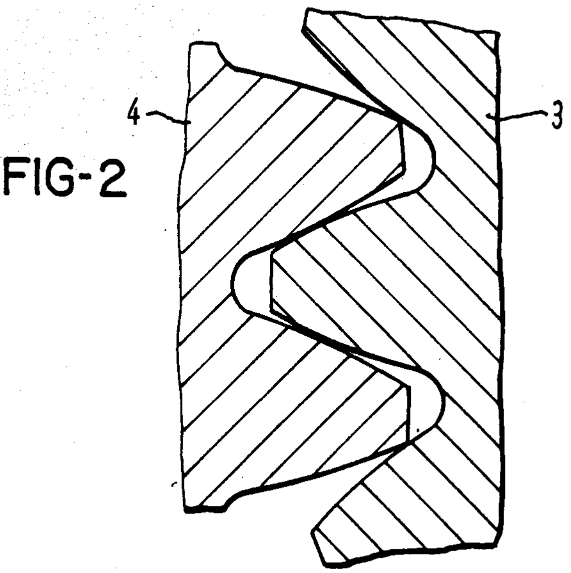
FIG. 2 is a fragmentary enlarged view of the gears having teeth in engagement during an interval.
Figure 3:
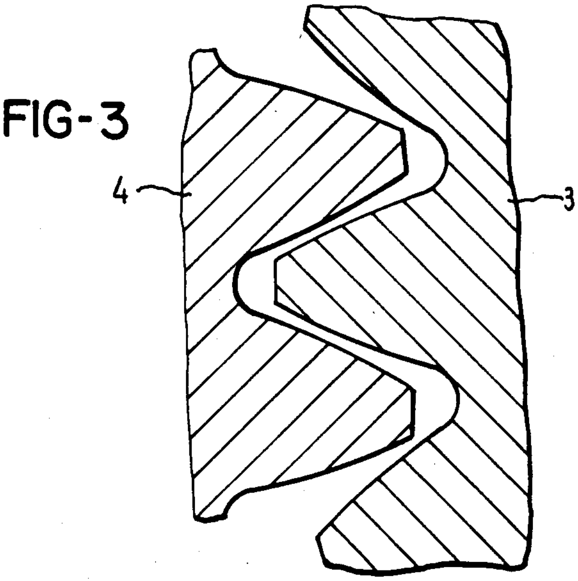
FIG. 3 is a fragmentary enlarged view of the gears having teeth with play between the engagement sides or flanks thereof outside of the interval.

The schematic drawing provides a partially cross-sectioned end view of one exemplary embodiment of the inventive auxiliary drive arrangement for an air compressor, that drive gear wheel or pinion of which that is mounted on a crankshaft meshes with a gear wheel on the camshaft of the internal combustion engine, with the air compressor pinion having two oppositely disposed intervals of enlarged tooth gauge, in conformity, for example, with a two-cylinder in-line air compressor with a 180°-crankshaft.

SUMMARY OF THE INVENTION

The auxiliary drive arrangement of the present invention is characterized primarily in that there is provided on the periphery of the air compressor pinion interval means having an enlarged tooth gauge, namely for a single cylinder/piston compressor one interval, and for a multi-cylinder/piston compressor several intervals, the number of which corresponds to the number of times the tangential force passes through zero during one air compressor crankshaft revolution, whereby the intervals have centers that are the maximum tooth gauge and are coordinated with the respective top dead center position of the air compressor piston, with this being achieved via an alignment of the air compressor pinion relative to the air compressor crankshaft.

Pursuant to the present invention, the tooth play or clearance between the air compressor pinion and the gear wheel on the camshaft is kept small only at the necessary point in time, i.e. at the top dead center position of the air compressor piston. In practice, there occurs during revolution of the air compressor crankshaft either one or several (as a function of the interval or intervals) changes of the engagement flank clearance, which leads to a considerable improvement of the load level in the air compressor drive mechanism. Where the drive shaft is mounted on roller bearings, a point load rather than an unfavorable peripheral load acts upon the inner ring of the roller bearing. Similarly, where the drive shaft is mounted on a friction bearing, a greater service life of the bearing results, since load conditions as well as lubricating and cooling functions are improved.

The fixing of the air compressor pinion in place on the crankshaft end can be achieved via an adapter sleeve, whereby the maximum tooth gauges (within the intervals) that are coordinated with the top dead center position of the air compressor piston are respectively disposed in a line that connects the two gear wheel centers (the air compressor pinion and the gear wheel on the camshaft); the meshing of the teeth between the two gears represents the connection. In this connection, a specific angle $\phi$ is respectively defined between the cylinder or piston axis of the air compressor and the aforementioned connecting line between the two gear wheel centers.

The increase of the tooth gauge per interval advantageously takes place in an increasing and decreasing manner over several teeth.

Further features of the present invention will be described in detail subsequently.

DESCRIPTION OF THE PREFERRED EMBODIMENTS

Referring now to the drawing in detail, illustrated is an air compressor 1 that is embodied as a single or multi-cylinder/piston compressor having an in-line or V arrangement. The piston or pistons 2 that are guided in the cylinder or cylinders are each driven in a known manner (not shown directly) via a respective connecting rod of a crankshaft, which is connected with a drive gear wheel or pinion 3 that in turn meshes with a gear wheel 4 on the camshaft of the internal combustion engine. The gear wheel 4, in turn, is driven in a non-illustrated manner via other gear wheels from the drive shaft of the internal combustion engine.

The periphery of the air compressor pinion 3 on the air compressor crankshaft is provided with either one or several intervals J having a definitive enlarged tooth gauge (corresponds to a greater profile offset). In the illustrated embodiment, two intervals J are disposed offset from one another by 180°, and correspond to a two-cylinder in-line air compressor. In so doing, the tooth play or clearance in the two interval regions is kept small. For example, by increasing the profile offset by 0.15 mm, the engagement side clearance is reduced by 0.1 mm. The enlarged tooth gauge is provided in intervals on the periphery as often as the tangential force passes through zero during one air compressor revolution. The increase or enlargement of the tooth gauge per interval takes place in an increasing and decreasing manner over a number of teeth.

The centers of the intervals (maximum tooth gauges) are coordinated with the respective top dead center position of the air compressor piston 2. In this connection, the respective centers are each disposed on a straight connecting line 5 that connects the two center points of the gear wheels 3 and 4. In so doing, a specific angle $\phi$ is defined between the connecting line 5 and the respective cylinder or piston axis 2*a* of the air compressor 1.

The drive gear or pinion 3 is aligned on the air compressor crankshaft with the aid of a non-illustrated adapter sleeve, i.e. is coordinated with the top dead center position or positions of the air compressor piston 2. In other words, the air compressor pinion 3 is secured on the air compressor crankshaft at a specific location (angular position).

It should finally be noted that as a modification of the present invention, the inventive larger tooth gauge intervals could also be disposed on the periphery of the camshaft gear wheel 4.

The present invention is, of course, in no way restricted to the specific disclosure of the specification and drawing, but also encompasses any modifications within the scope of the appended claims.

What I claim is:

1. In an auxiliary drive arrangement of an internal combustion engine for an air compressor embodied as a single or multi-cylinder/piston compressor, with the piston or pistons that are guided in the cylinder or cylinders being driven, via a respective connecting rod, by a crankshaft that is connected with a pinion that in turn is driven from the drive shaft of said internal combustion engine via gear wheels, wherein said air compressor pinion meshes with a gear wheel on a camshaft of said engine, the improvement wherein:

there is provided on the periphery of said air compressor pinion, for a single cylinder/piston compressor, one interval having an enlarged tooth gauge, and for a multi-cylinder/piston compressor, several such intervals, the number of which corresponds to the number of times the tangential force passes through zero during one air compressor crankshaft revolution, wherein said intervals have centers that are the maximum tooth gauge and are coordinated with the respective top dead center position of said air compressor pistons, with this being achieved via an alignment of said air compressor pinion relative to said air compressor crankshaft.

2. An auxiliary drive arrangement according to claim 1, in which said enlargement of said tooth gauge for a given interval is effected in an increasing and decreasing manner over several teeth.

* * * * *